United States Patent [19]

Dombro

[11] 4,335,016
[45] Jun. 15, 1982

[54] CATALYST AND METHOD

[75] Inventor: Robert A. Dombro, Clinton, Iowa

[73] Assignee: Chemplex Company, Rolling Meadows, Ill.

[21] Appl. No.: 237,297

[22] Filed: Feb. 23, 1981

[51] Int. Cl.³ .............................. C08F 4/06; C08F 4/16
[52] U.S. Cl. .................................. 252/429 B; 526/128
[58] Field of Search ..................................... 252/429 B

[56]  References Cited

U.S. PATENT DOCUMENTS

| | | | |
|---|---|---|---|
| 3,992,322 | 11/1976 | Dombro et al. | 252/429 B |
| 4,189,553 | 2/1980 | Birkelbach | 252/429 B |
| 4,218,339 | 8/1980 | Zucchini et al. | 252/429 B |
| 4,258,167 | 3/1981 | Tsubaki et al. | 252/429 B |
| 4,287,091 | 9/1981 | Selman | 252/429 B |
| 4,297,463 | 10/1981 | Ueno et al. | 252/429 B |

*Primary Examiner*—Arthur P. Demers
*Attorney, Agent, or Firm*—Wegner, McCord, Wood & Dalton

[57]  ABSTRACT

A new catalyst, method of making the catalyst and method of making polymers and copolymers therewith in which a porous support is reacted with an alkyl magnesium compound, the product of this is then reacted with a hydrocarbylhydrocarbyloxysilane and the product of this reacted with a titanium compound that contains halide. The resulting catalyst is activated with a cocatalyst that may be hydrogen or an alkyl derivative of lithium, magnesium, aluminum, aluminum halide or zinc.

14 Claims, No Drawings

CATALYST AND METHOD

BACKGROUND OF THE INVENTION

One of the features of this invention is to provide a novel catalyst and method having the above essentials with the catalyst being adaptable to low pressure, vapor phase, solution form, or especially, partical form processes. When used in a continuous particle form ethylene polymerization process, these catalysts produce resins with high melt index (low molecular weight), low Rd (narrow molecular weight distribution) and exceptionally low weight swell. Such resins are particularly suited to injection and rotational molding applications.

SUMMARY OF THE INVENTION

The catalysts of this invention have greater activity than conventional Ziegler catalysts because of the unique combination, type, and concentrations of catalyst components each of which is essential to the performance of the catalyst in solution form, gas phase, and in particular particle form polymerization processes. Rheological properties of the polyethylene resin produced by these catalysts show that they are particularly suited to injection and rotational molding applications.

DESCRIPTION OF THE PREFERRED EMBODIMENTS

This invention consists of improved supported type catalysts for the polymerization of olefins, especially ethylene or the copolymerization of olefins, especially ethylene with propylene, 1-butene, 1-hexene or 1-octene. The catalyst is made by either of two methods.

Method A (preferred): React in sequence: (1) a porous support with an alkyl magnesium compound; (2) the product of (1) with a hydrocarbyloxyhydrocarbylsilane; (3) the product of (2) with one or more titanium compounds that contain halide. The solid catalyst thus obtained is activated with a cocatalyst that is an alkyl lithium, alkyl magnesium, alkyl aluminum, alkyl aluminum halide, alkyl zinc or hydrogen. Activation may take place outside or within the polymerization reactor.

Method B: React in sequence: (1) a porous support with an alkyl magnesium compound; (2) the product from (1) is then reacted with the reaction product of a hydrocarbyloxyhydrocarbylsilane and one or more titanium compounds that contain halide. The solid product obtained is then activated as described under Method A.

The porous support is selected from the group consisting of alumina,, silica, magnesia, zirconia or combinations of these such as a zirconia-silica xerocogel. The preferred support is alumina or silica. The supports may be calcined at 1000°–1800° F., preferably 1500° F., silica preferably at 1300° F.

The alkyl magnesium compounds reacted with the support are essentially free of aluminum alkyls and are represented by the general formula $M'R_2$, where M' is magnesium and R is hydrogen or a hydrocarbyl radical. The preferred compounds are dialkylmagnesiums ($C_1$–$C_{20}$ in each alkyl) such as dimethylmagnesium, ethyl-n-butylmagnesium, or di-n-hexylmagnesium. The dialkylmagnesium compound is first reacted with the porous support at a concentration equal to or less than the calcined support's surface hydroxyl concentration. A concentration of dialkylmagnesium equal to about 90–100% of the support's hydroxyl concentration is preferred. The reaction is normally but not necessarily conducted in a hydrocarbon slurry at temperatures from ambient to about 150° C., but usually at 90°–100° C.

The hydrocarbyloxyhydrocarbylsilane is represented by the formula:

$$(RO)_n Si(R)_{4-n}$$

where the R groups may be the same or different, and are $C_1$ to $C_{20}$ alkyl, cycloalkyl, aryl, alkaryl, or aralkyl radicals, and n is a whole integer from 1 to 4. Suitable compounds are ethoxytrimethylsilane, diethoxydimethylsilane, triethoxymethylsilane, tetraethoxysilane, methoxytriphenylsilane, phenoxy trimethylsilane, dibutoxydicyclopentylsilane, and the like. The organometallic-treated porous support is normally treated with the silane compound at temperatures of 90°–100° C., usually, but not necessarily, in a hydrocarbon slurry.

Titanium compounds reacted with the above product are halides or oxyhalides. Examples are titanium tetrachloride, titanium oxydichloride, etc., the preferred compound being titanium tetrachloride. The titanium compound is reacted with the composite, consisting of the porous support, the alkyl magnesium compound and the silane compound, usually but not necessarily in a hydrocarbon slurry at temperatures in the range 90°–150° C., especially in the range 90°–100° C.

Finally, all unreacted components and by-products, if any, are preferably removed by dry hydrocarbon washing or by dry inert gas fluidization at temperatures up to about 150° C., but preferably at temperatures below 100° C.

The quantity of titanium compound used in the process of the present invention is suitably in the range of 0.1–8.0 wt.% based on the weight of the support material, and preferably in the range of 1.0–6.0 wt.%. The improved compound contains a halide, such as a chloride.

The improved catalysts prepared according to this invention may be used to polymerize 1-olefins of 2–8 carbon atoms and copolymers of said olefins and 1-olefins of 2–20 carbon atoms in liquid phase or vapor phase processes. These processes may be either batch or continuous. The mode of charging catalyst, olefin, and solvent if required, to the reactor system may follow any conventional practice applicable to batch or continuous operation.

The concentrations of catalyst components and the molar ratios between them are critical features of this catalyst system. This relationship is expressed by the following molar ratio:

$$\frac{[M]}{[M'] + n[Si]} = K$$

M represents the above transition metal molar concentration; the symbol M' represents the Group IIA metal molar concentration reacted with the porous support and is fixed by the surface hydroxyl concentration of the porous support as expressed earlier; Si represents the molar concentration of the hydrocarbyloxyhydrocarbylsilane compound; n is an integer corresponding to the number of hydrocarbyloxy groups present in the silane compound; and K is a number between about 0.5 to about 5 depending on the type of silane compound used in the catalyst preparation.

Activation of the solid catalyst is with a cocatalyst consisting of an organometallic compound or hydrogen or mixtures thereof. Examples are n-butyllithium, diethylmagnesium, triisobutylaluminum, diethylaluminum chloride, diethylzinc, diethylaluminum ethoxide, etc. The molar ratio of the cocatalyst to the transition metal is from 0.1:1 to 10:1, preferably about 3:1.

Ethylene was polymerized under two sets of conditions, each using triisobutylaluminum as cocatalyst. Pressure bottle (PB) conditions were 500 cc n-heptane as diluent, 35 psig ethylene fed on demand and at about 140° F. Data for these tests are presented in Table I. Particle form (PF) conditions were 2900 cc isobutane as diluent, 550 psig total pressure with ethylene and at 220° F. Data for these tests are presented in Table II.

All data concerning catalyst preparation and testing is presented in Tables I and II. The abbreviation BEM represents ethyl-n-butylmagnesium.

Comparative Examples 1 to 6 inclusive show that the absence of certain catalyst components give rise to catalysts displaying poor performance in terms of activity and/or potential for reactor fouling as per determined weight % of flake resin.

EXAMPLE 1

This catalyst was prepared without a Group IIA organometallic and a silane.

Under $N_2$, 10 g of silica calcined at 1300° F. (surface hydroxyl concentration 2.5 mmoles/g; surface area, 300 m$^2$/g; $N_2$pore volume, 1.7 cc/g) was mixed with 50 cc $TiCl_4$. The mixture was stirred and heated for one hour at 125°–130° C. The product was then collected under $N_2$, washed with pure n-hexane and dried. The final dry product contained 3.5 wt.% titanium.

Ethylene polymerization under PB conditions showed poor activity, 20 g/g cat./hr.

EXAMPLE 2

A similar catalyst was prepared as described in Example 1 except alumina calcined at 1300° F. (surface hydroxyl concentration, 0.96 mmole/g; surface area, 200 m$^2$/g; $H_2O$ pore volume, 1.13 cc/g) was used in place of silica. A product containing 3.9 wt.% titanium was obtained. Although the reactivity of this catalyst was four times greater than the corresponding catalyst based on silica, its activity was still considered low at 87 g/g cat./hr. under PB conditions.

EXAMPLE 3

This catalyst was prepared with a Group IIA organometallic compound but without a silane.

Under $N_2$, 20 g of alumina calcined at 1500° F. was mixed with 120 cc pure n-heptane. The mixture was stirred and heated under reflux for one hour. Without cooling, 1.8 cc of $TiCl_4$ was added and the mixture heated for an additional hour. The product was collected, washed with n-hexane, and dried under $N_2$. Analysis showed 2.8 wt.% titanium. Under PB conditions, reactivity was poor at 65 g/g cat./hr.

EXAMPLE 4

This catalyst was prepared with a silane but without a Group IIA organometallic compound.

Under $N_2$, 20 g 1500° F. calcined alumina was mixed with 120 cc pure n-heptane. Diethoxydimethylsilane, 2.7 cc, was then added. The mixture was stirred and heated to 90°–100° C. and held there for 0.25 hr. Without cooling, 5.5 cc of $TiCl_4$ was added and the mixture heated for an additional hour. The product was worked up in the usual manner. Analysis showed 6.6 wt.% titanium and 7.7 wt.% chloride; atomic ratio of Cl:Ti was 2. Under PB conditions, the catalyst was essentially inactive.

EXAMPLE 5

The catalyst of this example was prepared with a Group IIA organometallic compound and a silane compound which contained no hydrocarbyloxy groups.

Under $N_2$, 20 g of 1500° F. calcined alumina was mixed with 120 cc pure n-heptane and 29 cc of 10% BEM in n-heptane. The mixture was stirred and heated under reflux for one hour. The mixture was then cooled to about 50° C. and 2.2 cc of tetramethylsilane was added followed 0.25 hr. later by 1.8 cc $TiCl_4$. Again heating continued at 90°–100° C. for one hour. The recovered washed and dried product contained 3.8 wt.% titanium and 7.8 wt.% chloride; atomic ratio Cl:Ti=3. Under PB conditions and triisobutylaluminum as cocatalyst, no activity was detected.

EXAMPLE 6

No support was used in the preparation of this catalyst.

Twenty-nine cc of a 10 wt.% solution of ethyl-n-butylmagnesium was mixed under $N_2$ with 120 cc pure n-heptane. Subsequently 2.7 cc of diethoxydimethylsilane was added followed by heating of the solution under reflux for 0.25 hr. While hot, 4 cc of $TiCl_4$ was added slowly. The mixture containing the precipitated product was heated an additional hour. The usual work-up gave a solid product containing 18.1 wt.% Ti and 49.5% chloride; atomic ratio Cl:Ti=4. Reactivity under PB was high at 233 g polyethylene/g cat./hr. Although the activity was high, the resin contained a disordered array of particle size and shape from fines to flakes, 28 wt.% flakes. This catalyst behavior suggests a high potential for reactor fouling.

Invention Examples 7 to 10 inclusive cover the hydrocarbyloxyhydrocarbylsilane type. Each catalyst was prepared in the same way at a [Ti]:[Mg]+n[Si] ratio of about one. Data shows that all catalysts, except the catalyst of Example 7, were about three times more active in the polymerization of ethylene than the control catalyst of Examples 1–5.

EXAMPLE 7

Under $N_2$, 20 g of 1500° F. calcined alumina containing 0.96 mmole hydroxyl/gram was mixed with 120 cc pure n-heptane and 29 cc of 10 wt.% BEM in n-heptane. The mixture was heated at 90°–100° C. for one hour. Without cooling, 2.5 cc of ethoxytrimethylsilane was added to the mixture. Heating continued for an additional 0.25 hour. Again without cooling, 3.6 cc $TiCl_4$ was added. Heating continued at 90°–100° C. for an additional hour. Under $N_2$, the product was separated from the liquid phase and washed with n-hexane until free of unreacted ingredients or by-products. The washing solvent was removed by $N_2$ at <100° C. The final dry product contained 5.8 wt.% titanium and 9.0 wt.% chloride; atomic ratio Cl:Ti=2. Reactivity under PB conditions was 32 g polyethylene/g cat./hr. with triisobutylaluminum as cocatalyst.

EXAMPLE 8

This catalyst was prepared as described in Example 7 with the following ingredients: 20 g 1500° F. calcined alumina, 120 cc pure n-heptane, 29 cc 10 wt.% BEM in n-heptane, 2.7 cc diethoxydimethylsilane and 5.5 cc TiCl₄. A catalyst was obtained containing 2.5 wt.% titanium and 8.5 wt.% chloride; atomic ratio Cl:Ti was 5. The catalyst was highly active at 280 g polyethylene/g cat./hr. Triisobutylaluminum was the cocatalyst.

EXAMPLE 9

By the method of Example 7 a catalyst was prepared with 20 g 1500° F. calcined alumina, 120 cc pure n-heptane, 29 cc of 10 wt.% BEM in n-heptane, 3.2 triethoxymethylsilane and 7.3 cc TiCl₄. The final catalyst contained 8.6 wt.% titanium and 11.5 wt.% cloride; atomic ratio Cl:Ti was 2. Activity of the catalyst was high at 150 g polyethylene/g cat./hr. with triisobutylaluminum as cocatalyst.

EXAMPLE 10

The final catalyst was prepared by the method of Example 7 with 20 g 1500° F. calcined alumina, 120 cc pure n-heptane, 29 cc 10 wt.% BEM in n-heptane, 3.6 cc tetraethoxysilane and 9.2 cc TiCl₄. Analysis of the product showed 6.3 wt.% titanium and 11.0 wt.% chloride, atomic ratio Cl:Ti was 2. Ethylene polymerization activity was high at 179 g/g cat./hr. under PB conditions.

Invention Examples 11–14 inclusive cover the porous support type. Each catalyst was prepared according to the method described in Example 7. The molar ratio of [Ti]:[Mg]+n[Si] was one in each case. Diethoxydimethylsilane was the silane compound. Results show that a variety of supports may be successfully used. Triisobutylaluminum was the cocatalyst in each case.

EXAMPLE 11

This catalyst based on 1500° F. calcined alumina identical to that of Example 8. Reactivity was high at 280 g polyethylene/g cat./hr. under PB conditions.

EXAMPLE 12

This catalyst was prepared with 10 g 1100° F. calcined silica (surface area, 300 m²/g; N₂ pore volume, 1.7 cc/g), 60 cc pure n-heptane, 36 cc of 10 wt.% BEM in n-heptane, 3.4 cc of the silane compound of Example 8 and 6.5 cc TiCl₄. Analysis of the product showed 4.0 wt.% titanium and 18.4 wt.% chloride; atomic ratio Cl:Ti was 6. Activity was high at 195 g polyethylene/g cat./hr. in the presence of triisobutylaluminum as cocatalyst.

EXAMPLE 13

This catalyst was prepared with the same silica as described in Example 12. Only the component concentrations were reduced. Thus 20 grams silica, 120 cc pure n-heptane, 32 cc of 10 wt.% BEM in n-heptane and 6.2 cc titanium tetrachloride were reacted to give a product containing 4.8 wt.% titanium and 11 wt.% chloride; atomic ratio Cl:Ti was 3. Again, a highly active catalyst was obtained showing an activity of 190 grams polyethylene/g cat./hr. under PB conditions.

EXAMPLE 14

The final catalyst was based on a 1300° F. calcined silica with a surface area of 308 m²/g., nitrogen pore volume, 2.04 cc/g. and surface hydroxyl concentration of about 1.1 mmoles/g. by ignition. Twenty grams of this support in 120 cc pure n-heptane was reacted with 29 cc 10 wt.% BEM in n-heptane, 2.7 cc diethoxydimethylsilane and 5.5 cc titanium tetrachloride. Analysis showed 2.6 wt.% titanium and 6.7 wt.% chloride giving an atomic ratio of Cl:Ti equal to 3.5. Reactivity of this catalyst was 29 grams polyethylene/g. cat./hr.

Invention Examples 15–35 inclusive deal with the molar ratio of the catalyst components as expressed by the formula $$K = \frac{[Ti]}{[Mg] + n[Si]}.$$

In each catalyst preparation only the value of K is changed by increasing the amount of titanium tetrachloride used. The preferred value of K is a function of the type of silane component and the performance of the catalyst. Each catalyst was prepared by the method set forth in Example 7. All were based on 1500° F. calcined alumina containing 0.96 mmole hydroxyls/g., 20 grams of which was reacted with 29 cc 10 wt.% BEM in n-heptane plus an additional 120 cc pure n-heptane as diluent. The particular silane compound was then added followed by varying concentrations of TiCl₄. Triisobutylaluminum was used as cocatalyst. Again, all tests were under PB conditions.

EXAMPLES 15–18 INCLUSIVE

The catalysts of these examples were prepared with 2.5 cc ethoxytrimethylsilane. Varying amounts of TiCl₄ were then allowed to react to give catalysts containing titanium and chloride. The values of K, the wt.% titanium and chloride, the atomic ratio of chloride to titanium and the results of catalyst testing under PB conditions are presented in Table I.

Results show that at K values greater than about 1 reactivity was good. The catalyst of Example 17 (K=1.4) produced a resin with 8.1 wt.% flakes suggesting a moderate potential for reactor fouling; Example 18 (K=1.8) produced a resin with only 2 wt.% flakes. For ethoxytrimethylsilane, the preferred K value is greater than about 1.4 but less than about 2.0.

EXAMPLES 19 TO 24 INCLUSIVE

The catalysts of these examples were prepared with 2.7 cc of diethoxydimethylsilane. Varying amounts of TiCl₄ reacted to give catalysts containing titanium and chloride. Analytical data and the results of catalyst testing under PB conditions appear in Table I.

Results indicate that the preferred K value for diethoxydimethylsilane is greater than about 0.8. At this K value the wt.% flake resin produced by the catalyst was less than 1 wt.%

EXAMPLES 25 TO 29 INCLUSIVE

Catalysts of these examples were prepared with 3.2 cc triethoxymethylsilane. Addition of varying amounts of TiCl₄ gave catalysts containing titanium and chloride. Analytical data and the results of catalyst testing under PB conditions appear in Table I.

Results indicate that the preferred K value for triethoxymethylsilane is greater than about 1.4. At this K value the wt.% flake resin produced by the catalyst was less than 1 wt.%.

EXAMPLES 30 TO 35 INCLUSIVE

The catalysts of these examples were prepared with 3.6 cc of tetraethoxysilane. Varying amounts of TiCl₄ were reacted to give catalysts containing chloride and titanium. Analytical data and PB testing results appear in Table I.

Results indicate that the preferred K value for tetraethoxysilane is at least about 0.8. At this K value the wt.% flake resin was minimal at 0.3 wt.%.

EXAMPLE 36

This example shows that the silane compound and $TiCl_4$ need not be reacted singly and in sequence, but may be prereacted before addition to the organometallic compound treated porous support.

Under nitrogen, 20 grams of 1500° F. calcined alumina containing 0.96 mmole hydroxyl/gram was mixed with 120 cc pure n-heptane and 29 cc of 10% BEM in n-heptane. This mixture was stirred and heated one hour under reflux. In a separate vessel under nitrogen, 2.7 cc of diethoxydimethylsilane and 4 cc $TiCl_4$ were allowed to react in 50 cc pure n-heptane. This solution was then added to the alumina-BEM composite while hot. Heating was continued an additional one hour. The product was separated from the liquid phase and washed with n-hexane until free of unreacted ingredients and by-products. The product, dried under nitrogen, contained 4.9 wt.% titanium and 11.5 wt.% chloride; atomic ratio Cl:Ti was 3. Activity under PB conditions was high at 171 grams polyethylene/g cat./hr.

EXAMPLE 37

This example shows that a catalyst with good activity can be prepared with reduced amounts of $TiCl_4$ and silane provided that the preferred K value is maintained.

Thus, 20 grams of 1500° F. calcined alumina containing 0.96 mmole hydroxyl/g. was mixed with 120 cc of pure n-heptane and 29 cc of 10 wt.% of BEM in n-heptane. The mixture was stirred and refluxed for one hour. Without cooling, 0.6 cc of diethoxydimethylsilane was added and allowed to react an additional hour at reflux. Following the usual workup, the dry product contained 3.7 wt.% titanium and 9.5 wt.% chloride; atomic ratio Cl:Ti was 3. The K value was 0.8 which is the preferred value for the particular silane used. Activity under PB conditions was high at 147 grams polyethylene/g. cat./hr.

Table II shows data for the evaluation of several catalysts of this invention under particle form conditions. The catalyst for Example 1 was prepared according to Example 27 of Table I; the catalyst for Example 2 was prepared according to Example 13 of Table I. Results illustrate the sensitivity of these catalysts to hydrogen concentration as reflected in the melt index (MI) of the resin produced. Particular note is made of the corresponding Rd values which indicate narrow molecular weight distribution making resins produced by these catalysts suitable for injection molding applications. In addition, these catalysts produced resins with virtually no flake resin confirming minimal potential for reactor fouling.

The catalyst of Example 3, Table II was prepared according to Example 21 of Table I except on a 10× larger scale. The final catalyst contained 4.8 wt.% titanium and 8.0 wt.% chloride. It was tested in a continuous particle form loop reactor at 218° F. with 0.8 mole % hydrogen, 4.0 wt.% ethylene, 2.2 mole % butene −1 in isobutane and with triisobutylaluminum as cocatalyst. An injection molding grade resin with 10.4 melt index and 5.5 Rd was easily produced with no reactor fouling (∼0% flake resin).

TABLE I
PREPARATION AND EVALUATION OF CATALYSTS

| Example Number | Support | Type $R_nSi(OR)_{4-n}{}^a$ | mmoles/g. support BEM[b] | mmoles/g. support $R_nSi(OR)_{4-n}$ | mmoles/g. support TiCl$_4$ | Molar Ratio $R_nSi(OR)_{4-n}$/BEM | Molar Ratio TiCl$_4$/R$_n$Si(OR)$_{4-n}$ | Molar Ratio TiCl$_4$/BEM | K = [Ti]/([Mg]+n[Si]) | Wt. % Ti | Wt. % Cl | Atomic Ratio Cl/Ti | Reactivity[c] g./g. cat./hr. PB |
|---|---|---|---|---|---|---|---|---|---|---|---|---|---|
| General Catalysts | | | | | | | | | | | | | |
| 1 | 1300° F. SiO$_2${[d]} | — | — | — | neat | — | — | — | — | 3.5 | — | — | 20 |
| 2 | 1300° F. Al$_2$O$_3${[e]} | — | — | — | neat | — | — | — | — | 3.9 | — | — | 87 |
| 3 | 1500° F. Al$_2$O$_3${[e]} | — | 0.9 | — | 0.8 | — | — | 0.88 | — | 2.8 | — | — | 65 |
| 4 | 1500° F. Al$_2$O$_3${[e]} | (EtO)$_2$Si(CH$_3$)$_2${[f]} | — | 0.8 | 1.6 | — | 2 | — | 1.0 | 6.6 | 7.7 | 2 | 10 |
| 5 | 1500° F. Al$_2$O$_3${[e]} | Si(CH$_3$)$_4${[g]} | 0.9 | 0.8 | 0.8 | 0.88 | 1 | 0.88 | 0.88 | 3.8 | 7.8 | 3 | 13 |
| 6 | NONE | (EtO)$_2$Si(CH$_3$)$_2$ | 0.9 | 0.8 | 2.3 | 0.88 | 2.8 | 2.5 | 0.9 | 18.1 | 49.5 | 4 | 233 |
| Type of $R_nSi(OR)_{4-n}$ | | | | | | | | | | | | | |
| 7 | 1500° F. Al$_2$O$_3${[e]} | EtOSi(CH$_3$)$_3${[h]} | 0.9 | 0.8 | 1.6 | 0.88 | 2 | 1.8 | 0.9 | 5.8 | 9.0 | 2 | 32 |
| 8 | " | " | 0.9 | 0.8 | 2.8 | 0.88 | 3 | 2.8 | 1.0 | 2.5 | 8.5 | 5 | 280 |
| 9 | 1500° F. Al$_2$O$_3${[e]} | (EtO)$_3$SiCH$_3${[i]} | 0.9 | 0.8 | 3.3 | 0.88 | 4.1 | 3.7 | 1.0 | 8.6 | 11.5 | 2 | 150 |
| 10 | 1500° F. Al$_2$O$_3${[e]} | (EtO)$_4$Si[j] | 0.9 | 0.8 | 4.2 | 0.88 | 5.3 | 4.7 | 1.0 | 6.3 | 11.0 | 2 | 179 |
| Type of Support | | | | | | | | | | | | | |
| 11 | 1500° F. Al$_2$O$_3${[e]} | (EtO)$_2$Si(CH$_3$)$_2${[f]} | 0.9 | 0.8 | 2.8 | 0.88 | 3 | 2.8 | 0.96 | 2.5 | 8.5 | 5 | 280 |
| 12 | 1100° F. SiO$_2${[d]} | (EtO)$_2$Si(CH$_3$)$_2${[f]} | 2.25 | 1.98 | 5.9 | 0.88 | 3 | 2.6 | 0.95 | 4.0 | 18.4 | 6 | 195 |
| 13 | 1100° F. SiO$_2${[d]} | (EtO)$_2$Si(CH$_3$)$_2${[f]} | 1.0 | 0.9 | 2.8 | 0.9 | 3.1 | 2.8 | 1.0 | 4.8 | 11.0 | 3 | 190 |
| 14 | 1300° F. SiO$_2${[k]} | (EtO)$_2$Si(CH$_3$)$_2${[f]} | 0.9 | 0.8 | 2.5 | 0.88 | 3.1 | 2.8 | 1.0 | 2.6 | 6.7 | 3.5 | 29 |
| Molar Ratio of [Ti]:[Mg]+n[Si] | | | | | | | | | | | | | |
| 15 | 1300° F. B—Al$_2$O$_3${[e]} | EtOSi(CH$_3$)$_3${[h]} | 0.9 | 0.8 | 0.8 | 0.88 | 1 | 0.88 | 0.47 | 3.1 | 7.4 | 3 | 34 |
| 16 | 1500° F. B—Al$_2$O$_3${[e]} | " | 0.9 | 0.8 | 1.6 | 0.88 | 2 | 1.8 | 0.94 | 6.2 | 11.7 | 3 | 32 |
| 17 | " | " | 0.9 | 0.8 | 2.4 | 0.88 | 3 | 2.6 | 1.4 | 3.3 | 10.1 | 4 | 165 |
| 18 | " | " | 0.9 | 0.8 | 3.1 | 0.88 | 4 | 3.4 | 1.8 | 7.9 | 10.8 | 2 | 134 |
| 19 | " | (EtO)$_2$Si(CH$_3$)$_2${[f]} | 0.9 | 0.8 | 0.8 | 0.88 | 1.0 | 0.88 | 0.32 | 3.1 | 7.9 | 3 | 45 |
| 20 | " | " | 0.9 | 0.8 | 1.6 | 0.88 | 2.0 | 1.8 | 0.64 | 3.6 | 9.3 | 3.5 | 138 |
| 21 | " | " | 0.9 | 0.8 | 2.6 | 0.88 | 2.5 | 2.2 | 0.80 | 2.8 | 8.3 | 4 | 171 |
| 22 | " | " | 0.9 | 0.8 | 2.4 | 0.88 | 3.0 | 2.8 | 0.96 | 2.5 | 8.5 | 5 | 280 |
| 23 | " | " | 0.9 | 0.8 | 2.8 | 0.88 | 3.5 | 3.1 | 1.12 | 5.1 | 10.6 | 3 | 46 |
| 24 | 1500° F. Al$_2$O$_3${[e]} | (EtO)$_2$Si(CH$_3$)$_2$ | 0.9 | 0.8 | 3.2 | 0.88 | 4.0 | 3.6 | 1.28 | 6.2 | 11.7 | 3 | 51 |
| 25 | " | (EtO)$_3$SiCH$_3${[i]} | 0.9 | 0.8 | 1.98 | 0.88 | 2.5 | 2.2 | 0.6 | 8.1 | 10.1 | 2 | 134 |
| 26 | " | " | 0.9 | 0.8 | 3.3 | 0.88 | 4.1 | 3.7 | 1.0 | 8.6 | 11.5 | 2 | 150 |
| 27 | " | " | 0.9 | 0.8 | 4.6 | 0.88 | 5.8 | 5.1 | 1.4 | 2.8 | 8.5 | 4 | 237 |
| 28 | " | " | 0.9 | 0.8 | 5.9 | 0.88 | 7.4 | 6.6 | 1.8 | 5.4 | 11.5 | 3 | 291 |
| 29 | " | " | 0.9 | 0.8 | 7.3 | 0.88 | 9.1 | 8.1 | 2.2 | 7.2 | 11.7 | 2 | 223 |
| 30 | 1500° F. Al$_2$O$_3${[e]} | (EtO)$_4$Si[j] | 0.9 | 0.8 | 1.6 | 0.88 | 2.0 | 1.7 | 0.40 | 5.4 | 10.3 | 2 | 34 |
| 31 | " | " | 0.9 | 0.8 | 2.4 | 0.88 | 3.0 | 2.8 | 0.58 | 2.0 | 8.5 | 6 | 204 |
| 32 | " | " | 0.9 | 0.8 | 3.2 | 0.88 | 4.0 | 3.6 | 0.78 | 2.3 | 8.9 | 5 | 221 |
| 33 | " | " | 0.9 | 0.8 | 4.2 | 0.88 | 5.3 | 4.7 | 1.00 | 6.3 | 11.0 | 2 | 179 |
| 34 | " | " | 0.9 | 0.8 | 5.0 | 0.88 | 6.3 | 5.6 | 1.20 | 6.2 | 11.0 | 2 | 213 |
| 35 | " | " | 0.9 | 0.8 | 6.6 | 0.88 | 8.3 | 7.3 | 1.60 | 5.9 | 11.5 | 3 | 184 |
| Prereacted Silane and Titanium Compounds | | | | | | | | | | | | | |
| 36 | 1500° F. B—Al$_2$O$_3${[e]} | (EtO)$_2$Si(CH$_3$)$_2$ | 0.9 | 0.8 | 2.25 | 0.88 | 2.8 | 2.5 | 0.9 | 4.9 | 11.5 | 3 | 171 |
| Reduced Silane and Titanium | | | | | | | | | | | | | |

TABLE I-continued
PREPARATION AND EVALUATION OF CATALYSTS

| Example Number | Type Support | Type $R_nSi(OR)_{4-n}$[a] | mmoles/g. support BEM[b] | mmoles/g. support $R_nSi(OR)_{4-n}$ | mmoles/g. support TiCl$_4$ | Molar Ratio $R_nSi(OR)_{4-n}$/BEM | Molar Ratio TiCl$_4$/$R_nSi(OR)_{4-n}$ | Molar Ratio TiCl$_4$/BEM | $K = \frac{[Ti]}{[Mg] + n[Si]}$ | Wt. % Ti | Wt. % Cl | Atomic Ratio, Cl/Ti | Reactivity[c] g./g. cat./hr. PB |
|---|---|---|---|---|---|---|---|---|---|---|---|---|---|
| 37 | 1500° F. B—Al$_2$O$_3$[e] | (EtO)$_2$Si(CH$_3$)$_2$ | 0.9 | 0.175 | 1.0 | 0.2 | 5.7 | 1.1 | 0.8 | 3.7 | 9.5 | 3 | 147 |

Footnotes to Table I
[a]Hydrocarbyloxyhydrocarbylsilane
[b]Ethyl-n-butylmagnesium
[c]PB is pressure bottle conditions: 500 cc n-heptane, 35 psig ethylene pressure fed on demand and 140° F. Triisobutylaluminum was used as cocatalyst.
[d]Surface area, 300 m$^2$/g; N$_2$ pore volume, 1.7 cc/g.
[e]Surface area, 200 m$^2$/g; N$_2$ pore volume, 1.13 cc/g; surface hydroxyl concentration about 0.96 mmoles/g after calcination at 1500° F. for four hours in N$_2$.
[f]Diethoxydimethylsilane
[g]Tetramethylsilane
[h]Ethoxytrimethylsilane
[i]Triethoxymethylsilane
[j]Tetraethoxysilane
[k]Surface area, 308 m$^2$g; N$_2$ pore volume, 2.04 cc/g; surface hydroxyl concentration about 1.1 mmoles/g by ignition.

TABLE II

EVALUATION OF CATALYSTS UNDER PARTICLE FORM CONDITIONS. RESIN PHEOLOGICAL PROPERTIES VERSUS HYDROGEN CONCENTRATION.

| Example Number | Type Support | $R_nSi(OR)_{4-n}$[a] mmoles/g. support | BEM mmoles/g. support | $R_nSi(OR)_{4-n}$ mmoles/g. support | $TiCl_4$ mmoles/g. support | Molar Ratio $R_nSi(OR)_{4-n}$/BEM | $TiCl_4/R_nSi(OR)_{4-n}$ | $Ti/Cl_4/$BEM | $K = \frac{[Ti]}{[Mg] + n[Si]}$ |
|---|---|---|---|---|---|---|---|---|---|
| 1 | 1500° F. $Al_2O_3$[f] | $(EtO)_3SiCH_3$ | 0.9 | 0.8 | 4.6 | 0.88 | 5.8 | 5.1 | 1.4 |
| 2 | 1100° F. $SiO_2$[g] | $(EtO)_2Si(CH_3)_2$ | 1.0 | 0.9 | 2.8 | 0.9 | 3.1 | 2.8 | 1.0 |
| 3 | 1500° F. $Al_2O_3$ | " | 0.9 | 0.8 | 2.0 | 0.88 | 2.5 | 2.2 | 0.8 |

| Example Number | Wt. % Ti | Wt. % Cl | Atomic Ratio Cl/Ti | Reactivity[c] g./g. cat./hr. PF (psig $H_2$) | Productivity[c] g./g. cat. PF (psig $H_2$) | Polyethylene Resin Properties[d] Rd | Sw | MI |
|---|---|---|---|---|---|---|---|---|
| 1 | 2.8 | 8.5 | 4 | 774 (20) | 2322 (20) | 2.9 | 2.9 | 0.4 |
|   |     |     |   | 551 (50) | 1653 (50) | 5.4 | 2.2 | 4.3 |
|   |     |     |   | 334 (75) | 1000 (75) | — | — | 8.8 |
| 2 | 4.8 | 11.0 | 3 | 1261 (none) | 2521 (none) | — | — | HL[e] |
|   |     |     |   | 525 (20) | 1576 (20) | 4.7 | 2.3 | 2.4 |
|   |     |     |   | 756 (50) | 2267 (50) | 4.4 | 2.1 | 2.0 |
|   |     |     |   | 439 (75) | 1317 (75) | — | — | 10.2 |
| 3 | 4.8 | 8.0 | 2 | — | 1400 ($H_2$)[h] | 5.5 | — | 10.4 |

[a] Hydrocarbyloxyhydrocarbylsilane
[b] Ethyl-n-butylmagnesium
[c] PF is particle form conditions; 2900 cc isobutane, 550 psig total pressure and 220° F. Triisobutyl-aluminum as cocatalyst.
[d] Rd is a measure of the molecular weight distribution as defined by M. Shida and L. V. Cancio, Polymer Engineering and Science, March, 1971, Vol. II, No. 2; Sw is weight swell as defined by L. V. Cancio and R. S. Joyner, Modern Plastics, January, 1977; MI is melt index determined according to ASTM D/238-62. condition E.
[e] High load melt index determined according to ASTM D/238-62, condition F.
[f] Surface area, 200/m²/g; $N_2$ pore volume, 1.13 cc/g.; surface hydroxyl concentration about 0.96 mmoles/g. after calcination at 1500° F. for four hours in $N_2$.
[g] Surface area, 300 m²/g.; $N_2$ pore volume, 1.7 cc/g.
[h] Continuous particle form conditions of 218° F., 0.8 mole % hydrogen, 4.5 wt.% ethylene, 2.2 mole % butene-1 as comonomer, isobutane and triisobutylaluminum as cocatalyst.

I claim:

1. A catalyst prepared by (1) forming a mixture of a finely divided porous support comprising silica, alumina, zirconia, thoria, or magnesia or mixtures thereof and an alkyl magnesium compound; (2) heating said mixture for a time and at a temperature sufficient to react said support and said alkyl magnesium compound; (3) reacting, by heating, the product of (2) with a hydrocarbylhydrocarbyloxysilane; (4) reacting, by heating, the product of (3) with a titanium compound that contains a halide; or (5) reacting the product of (2) with the reaction product of a hydrocarbylhydrocarbyloxysilane and a titanium compound that contains halide; and (6) activating the catalyst product of (4) or (5) with a cocatalyst comprising hydrogen or an alkyl lithium, alkyl magnesium, alkyl aluminum, alkyl aluminum halide or alkyl zinc.

2. The catalyst of claim 1 wherein said alkyl magnesium compound is essentially free of aluminum alkyls.

3. The catalyst of claim 1 wherein the silane of (3) has the formula $(RO)_nSi(R)_{4-n}$ where the R groups may be the same or different, and are $C_1$ to $C_{20}$ alkyl, cycloalkyl, aryl, alkaryl, or aralkyl radicals, and n is a whole integer from 1 to 4.

4. The catalyst of claim 1 wherein said compound of (4) comprises the halide or oxyhalide of titanium.

5. The catalyst of claim 4 wherein said compound of (4) comprises titanium tetrachloride.

6. The catalyst of claim 1 wherein the reactants of steps (1)–(5) and their molar ratios are according to the following formula $$\frac{[M]}{[M'] + n[Si]} = K$$

in which M represents the transition metal molar concentration, M' represents the metal molar concentration of the metal reacted with the porous support and is fixed by the surface hydroxyl concentration of the porous support, Si represents the molar concentration of the hydrocarbyloxyhydrocarbylsilane compound, n is an integer corresponding to the number of hydrocarbyloxy groups attached to the silane compound and K is a number between about 0.5 to about 5.

7. The catalyst of claim 1 in which the cocatalyst is hydrogen, alkyl lithium, alkyl magnesium, alkyl aluminum, alkyl zinc or alkyl aluminum chloride in which each alkyl group has 1 to 12 carbon atoms.

8. The process of preparing an active polymerization catalyst comprising the steps of (1) forming a mixture of a finely divided porous support comprising silica, alumina, zirconia, thoria, or magnesia or mixtures thereof and an alkyl magnesium compound; (2) heating said mixture for a time and at a temperature sufficient to react said support and said alkyl metallic compound; (3) reacting, by heating, the product of (2) with a hydrocarbylhydrocarbyloxysilane; (4) reacting, by heating, the product of (3) with a titanium compound that contains halide or (5) reacting the product of (2) with the reaction product of a hydrocarbylhydrocarbyloxysilane and a titanium compound that contains chlorine; and (6) activating the catalyst product of (4) or (5) with a cocatalyst comprising hydrogen or an alkyl lithium,, alkyl magnesium, alkyl aluminum, alkyl aluminum halide or alkyl zinc.

9. The process of claim 8 wherein said alkyl magnesium compound is essentially free of aluminum alkyls.

10. The process of claim 8 wherein the silane of (3) has the formula $(RO)_nSi(R)_{4-n}$ where the R groups may be the same or different, and are $C_1$ to $C_{20}$ alkyl, cycloalkyl, aryl, alkaryl, or aralkyl radicals, and n is a whole integer from 1 to 4.

11. The process of claim 8 wherein said compound of (4) comprises the halide or oxyhalide of titanium.

12. The process of claim 11 wherein said compound of (4) comprises titanium tetrachloride.

13. The process of claim 8 wherein the reactants of steps (1)–(5) and their molar ratios are according to the following formula $$\frac{[M]}{[M'] + n[Si]} = K$$

in which M represents the transition metal molar concentration, M' represents the metal molar concentration of the metal reacted with the porous support and its concentration is fixed such that all the surface hydroxyls of the porous support are essentially reacted, Si represents the molar concentration of the hydrocarbyloxyhydrocarbylsilane compound, n is an integer corresponding to the number of hydrocarbyloxy groups attached to the silane compound and K is a number between about 0.5 and about 5.

14. The process of claim 8 in which the cocatalyst is hydrogen, alkyl lithium, alkyl magnesium, alkyl aluminum, alkyl zinc or alkyl aluminum halide in which each alkyl group has 1 to 12 carbon atoms.

* * * * *